(12) United States Patent
Mesrsmid

(10) Patent No.: US 11,829,509 B2
(45) Date of Patent: Nov. 28, 2023

(54) DATA EXFILTRATION DETECTION

(71) Applicant: Avast Software s.r.o., Prague (CZ)

(72) Inventor: Martin Mesrsmid, Prague (CZ)

(73) Assignee: Avast Software s.r.o., Prague (CZ)

( * ) Notice: Subject to any disclaimer, the term of this patent is extended or adjusted under 35 U.S.C. 154(b) by 146 days.

(21) Appl. No.: 17/377,298

(22) Filed: Jul. 15, 2021

(65) Prior Publication Data

US 2023/0015269 A1    Jan. 19, 2023

(51) Int. Cl.
*G06F 21/62* (2013.01)
*G06F 21/57* (2013.01)
*G06Q 10/0635* (2023.01)
*G06Q 10/067* (2023.01)

(52) U.S. Cl.
CPC ........ *G06F 21/6245* (2013.01); *G06F 21/577* (2013.01); *G06F 21/6236* (2013.01); *G06Q 10/067* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 2016/0080406 A1* | 3/2016 | Sadovsky | H04L 63/1408 726/23 |
| 2018/0046796 A1* | 2/2018 | Wright | G06F 21/45 |
| 2018/0173891 A1* | 6/2018 | Wang | G06F 21/6245 |
| 2020/0137096 A1* | 4/2020 | Endler | H04L 63/0846 |
| 2020/0279041 A1 | 9/2020 | Endler | |
| 2020/0279050 A1* | 9/2020 | Endler | G06F 16/144 |

FOREIGN PATENT DOCUMENTS

EP    4 120 111    1/2023

OTHER PUBLICATIONS

EPO Extended European Search Report dated Nov. 15, 2022 for EPO Application No. 22185317.9, application published as EP 4 120 111.

* cited by examiner

*Primary Examiner* — Alexander Lagor
*Assistant Examiner* — Felicia Farrow
(74) *Attorney, Agent, or Firm* — Dovas Law, P.C.

(57) ABSTRACT

A computer-implemented method includes creating an account including an account value on an online service. The account value is modified periodically to activate a plurality of account values respectively associated with a plurality of times at which the plurality of account values were respectively activated on the account. A network-accessible data repository is scanned to detect a first value of the plurality of account values, the first value associated with a first time of the plurality of times at which the first value was activated. Responsive to detecting the first value a notification is provided indicating a data leak from the online service including an indication of when the data leak occurred based on the first time at which the first value was activated on the account and a second time at which a second value was activated on the account to replace the first value.

33 Claims, 8 Drawing Sheets

DATA EXFILTRATION DETECTION

FIELD OF INVENTION

The invention relates generally to data exfiltration in network-connected computing systems, and more particularly to data exfiltration detection in network-connected computing systems.

BACKGROUND

Data breaches are a pervasive problem in network-connected computing systems enabling online services. Data is often exfiltrated from breached computing systems, and this data may be made accessible publicly over the internet or on overlay networks within the internet (e.g., darknets, the dark web). Exfiltrated data may include account credentials (e.g., username and password) of users of a particular online service.

Breach detection technologies are currently available to detect that account credentials of users of online services have leaked from the online services and are being published on the dark web. Notifying users of a breach and publication of their account credentials serves as an incentive for the users to change their passwords to avoid their account information being misused and their identities stolen.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A computer-implemented method is provided which includes creating an account including an account value on an online service. The account value of the account on the online service is modified periodically to activate a plurality of account values respectively associated with a plurality of times at which the plurality of account values were respectively activated on the account. A network-accessible data repository is scanned to detect a first value of the plurality of account values on the network-accessible data repository, the first value associated with a first time of the plurality of times at which the first value was activated on the account. Responsive to detecting the first value on the network-accessible data repository a notification is provided indicating a data leak from the online service including an indication of when the data leak occurred based on the first time of the plurality of times at which the first value was activated on the account and a second time of the plurality of times at which a second value was activated on the account to replace the first value.

Another computer-implemented method is provided which includes creating a plurality of accounts on a plurality of online services, the plurality of accounts each including an account value. The account value of each of the plurality of accounts on the plurality of online services is modified periodically to activate a plurality of account values on each of the plurality of accounts respectively associated with a plurality of times at which the plurality of account values were respectively activated on each of the plurality of accounts. A plurality of network-accessible data repositories including data are scanned. The plurality of account values are compared to the data of the plurality of network-accessible data repositories to detect a first value of the plurality of account values associated with a particular online service of the plurality of online services and associated with a first time of the plurality of times at which the first value was activated on a particular account of the particular online service. Responsive to detecting the first value a notification is provided indicating a data leak from the particular online service including an indication of when the data leak occurred based on the first time at which the first value was activated on the particular account.

Another computer-implemented method is provided which includes creating an account including an account value on an online service. The account value of the account on the online service is modified periodically to activate a plurality of account values respectively associated with a plurality of times at which the plurality of account values were respectively activated on the account. Access by a user via a computing device to the online service is detected, the access occurring at a certain time. A network-accessible data repository is scanned to detect a particular value of the plurality of account values on the network-accessible data repository, the particular value associated with a particular time of the plurality of times at which the particular value was activated on the account. The certain time is compared to the particular time, and a notification is provided to the user of the computing device based on the access by the user to the online service, based on the detection of the particular value on the network-accessible data repository, and based on the comparison of the certain time to the particular time.

Another computer-implemented method is provided which includes creating a plurality of accounts on a plurality of online services, the plurality of accounts each including an account value. The account value of each of the plurality of accounts on the plurality of online services is modified periodically to activate a plurality of account values on each of the plurality of accounts respectively associated with a plurality of times at which the plurality of account values were respectively activated on each of the plurality of accounts. Access by a user via a computing device to a particular online service of the plurality of online services is detected. A plurality of network-accessible data repositories including data are scanned. The plurality of account values are compared to the data of the plurality of network-accessible data repositories to detect a particular value of the plurality of account values associated with the particular online service of the plurality of online services and associated with a particular time of the plurality of times at which the particular value was activated on a particular account of the particular online service. A notification to the user of the computing device is provided based on the access by the user to the particular online service and based on the detection of the particular value.

A network-enabled notification system is provided including a computing system including one or more processors and one or more non-transitory computer readable storage media having encoded thereon instructions that when executed by the one or more processors cause the computing system to perform a process. The process includes creating a plurality of accounts on a plurality of online services, the plurality of accounts each including an account value, and modifying the account value of each of the plurality of accounts on the plurality of online services periodically to activate a plurality of account values on each of the plurality of accounts respectively associated with a plurality of times at which the plurality of account values were respectively activated on each of the plurality of accounts. The process also includes scanning a plurality of network-accessible data repositories including data, and comparing the plurality of account values to the data of the plurality of network-accessible data repositories to detect a particular value of the plurality of account values associated with a particular online service of the plurality of online services and associated with a first time of the plurality of times at which the particular value was activated on a particular account of the particular online service. The process further includes responsive to detecting the particular value providing a notification indicating a data leak from the particular online service including an indication of when the data leak occurred based on the first time at which the particular value was activated.

A further network-enabled notification system is provided including a first computing system including one or more first processors and one or more first non-transitory computer readable storage media having encoded thereon first instructions that when executed by the one or more first processors cause the first computing system to perform a first process. The first process includes creating a plurality of accounts on a plurality of online services, the plurality of accounts each including an account value, and modifying the account value of each of the plurality of accounts on the plurality of online services periodically to activate a plurality of account values on each of the plurality of accounts respectively associated with a plurality of times at which the plurality of account values were respectively activated on each of the plurality of accounts. The first process further includes scanning a plurality of network-accessible data repositories including data, and comparing the plurality of account values to the data of the plurality of network-accessible data repositories to detect a particular value of the plurality of account values associated with a particular online service of the plurality of online services and associated with a particular time of the plurality of times at which the particular value was activated on a particular account of the particular online service. The further network-enabled notification system further includes a second computing system in network communication with the first computing system, the second computing system including a user interface and one or more second processors and one or more second non-transitory computer readable storage media having encoded thereon second instructions that when executed by the one or more second processors cause the second computing system to perform a second process. The second process includes detecting access by a user via the second computing system to the online service, and providing a notification to the user of the second computing system via the user interface based on the access by the user to the particular online service and based on the detection of the particular value.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

A search performed publicly over the internet or on overlay networks within the internet (e.g., darknets, the dark web) may yield credentials of a particular user which have been leaked from a particular online service. However, such search is unlikely to provide an indication of from which online service the credentials have leaked and when the leak occurred. It would be beneficial to know from which online service the leaked data has leaked ("compromised online service"). This information can be used to protect other users for example by notifying those users who have accounts on the compromised online service and notifying those users who plan to create accounts on the compromised online service. An online service can be enabled by a website or a local application installed on a computing device (i.e., an "app"), for example a banking application, a social networking application, an online news outlet, an email service, an electronic messaging service, or other network enabled service.

Figure 1:
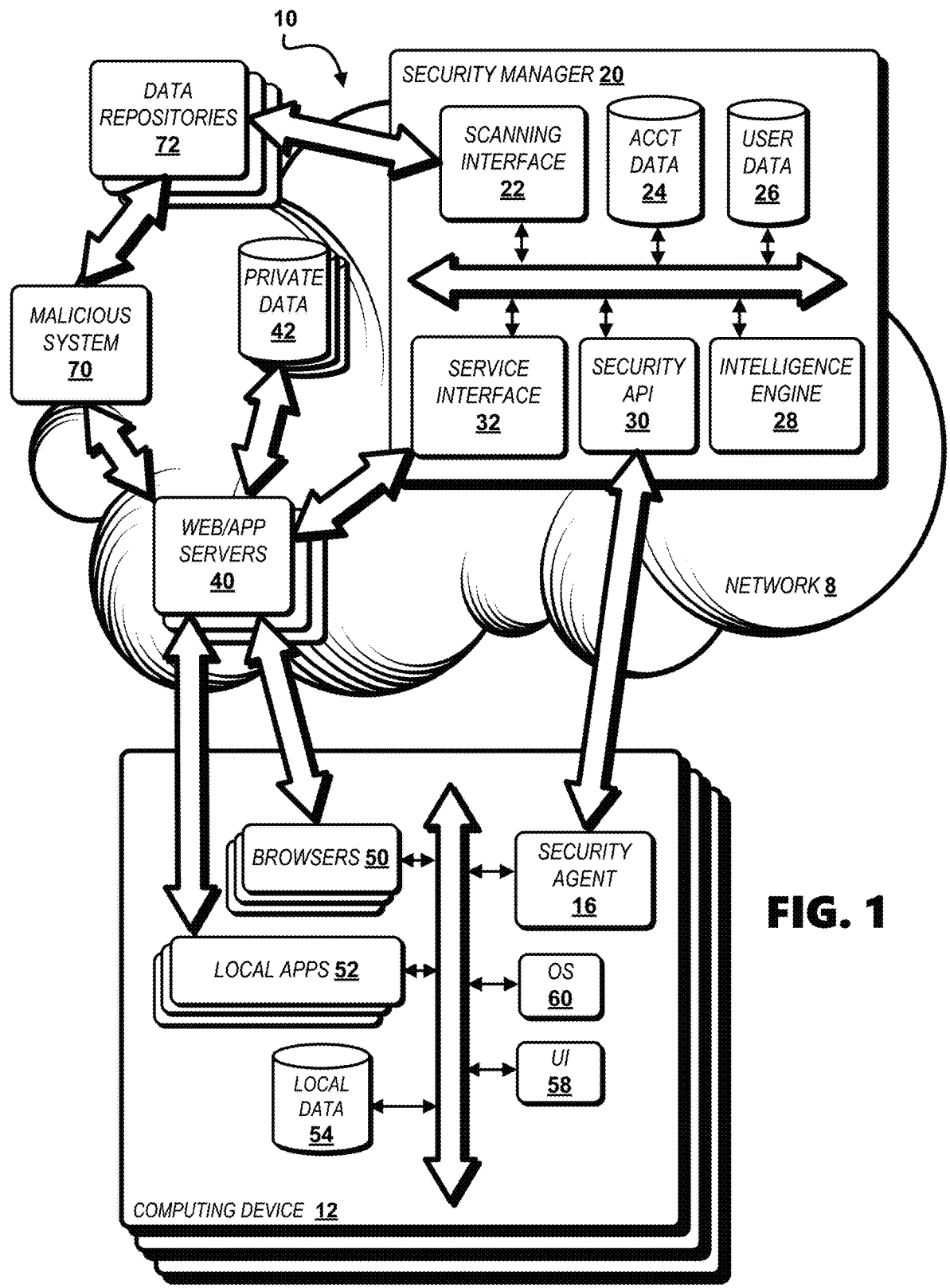
FIG. 1 shows an environment in which data exfiltrated from private datastores is detected on data repositories via a security manager according to illustrative embodiments.

Referring to FIG. 1, an environment 10 enabled by a computer network 8 is illustrated in which user data exfiltrated from private datastores 42 is detected on online data repositories 72 via a network-connectable processor-enabled security manager 20. The computer network 8 includes one or more wired or wireless networks or a combination thereof, for example a local area network (LAN), a wide area network (WAN), the internet, mobile telephone networks, and wireless data networks such as Wi-Fi™ and 3G/4G/5G cellular networks. A security agent 16 enables monitoring of the browsing history and clickstream of a user on a computing device 12, providing the security manager 20 with user use data including an ordered sequence of hyperlinks followed by a user at one or more websites or other network destinations.

The security manager 20 is enabled to create accounts on a plurality of online services enabled by web/app servers 40 (hereinafter "web/app server"). The created accounts are beneficially synthetic accounts not associated with any real user. Alternatively, the created accounts can correspond to a real user. The security manager 20 is further enabled to change passwords and other account values periodically and generate strong passwords (e.g., 16 character alphanumeric lower/upper case with special characters) and other account values (e.g., username, email address) of the accounts, which account values are beneficially unique. The security manager 20 via a service interface 32 on a regular basis (e.g., once a day, every 12 hours, or every 48 hours) performs changes of the passwords and/or other account values of the created accounts. The security manager 20 engages web/app servers 40 via the service interface 32 to register new accounts and modify account values (e.g., account passwords) for example by accessing online services including websites, applications, and other online services as a particular synthetic user (e.g., a bot). A log is maintained in an accounts datastore 24 of current and previous account values including passwords and other accounts values of the accounts for each online service together with dates and times the account values (e.g., account passwords) were changed.

The security manager 20 performs periodic or continuous scans of the internet and overlay networks within the internet (e.g., darknets, the dark web) via a scanning interface 22 in an effort to detect leaked account values stored in data repositories 72. Leaks can occur in a number of manners, for example a malicious system 70 can exfiltrate data from private datastores 42 via malware that the malicious system 70 enables on a web/app server 40.

When one of the account values of the created accounts is detected, the security manager 20 can determine the online service that was breached and a date/time of the breach by looking up the detected account value in the account datastore 24, which includes current and previous account values, via the intelligence engine 28. For example, if it is known that a combination of a particular email "john.doe@gmail.com" and a particular password "1aA2bB3cC4dD5eE" was only existing from 12:00 AM Jan. 4, 2020 until 12:00 AM Jan. 5, 2020 (when the password was changed) on the site "abcxyz.com", it is concluded that the leak must have happened on abcxyz.com on Jan. 4, 2020. During periodic or continuous scans of the internet and overlay networks within the internet, the security manager 20 can further scan for account values of accounts not created or managed by the security manager 20, for example accounts of users of computing devices 12 on which the security agent 16 is enabled.

By creating a large number of accounts (e.g., synthetic accounts) on online services and by regularly changing their account values (e.g., changing passwords) and tracking those changes, the security manager 20 can determine which online service is the source of a particular data leak when a leaked account value belonging to a particular account is discovered.

The security manager 20 is configured to warn users of the online service from which the data leaked that there was a breach. Warnings are beneficially enabled to be sent to any user of a particular online service for which data was leaked, not only users whose actual data was found during network scans. Warnings are also beneficially enabled to be sent to warn users of computing devices 12 who are about to create an account on an online service (e.g., a website) that suffered a leak. Further an online service can be scored based on its leaking of private user data, and such score can be provided to users of computing devices 12 who have an account or are about to create an account on the online service. Warnings are also beneficially enabled to be sent to warn systems or operators of the online service, which systems or operators may not be aware of the data leak. The use of unique account values by the security manager 20 provides the ability to identify and notify the online service from which the leak occurred which may prevent further leaking of user data.

The web/app servers 40 can function to enable local applications 52 or components of local applications 52. The web/app servers 40 can further enable online services including network-based applications, webpages, or other online services accessible via a browser 50. A user is enabled to engage an online service enabled by a web/app server 40 by registering a user account for which account credentials (e.g., username, password) are created by the user or an administrator of the service and stored in a private datastore 42 managed by the web/app server 40.

The security manager 20 coupled to a computing device 12 enables threat detection and mitigation to be provided to the computing device 12 via a security agent 16. The security agent 16 monitors user activity on the computing device 12 including a user's use of local and network-based applications and a user's accessing of websites and of particular content on local and network-based applications and websites, which data is fed to the security manager 20 via a security application program interface ("API") 30.

The security agent 16 is beneficially provided integral with or as an extension or plugin to one or more browser applications 50 ("browsers") and provides notices to a user via a user interface 58. The security agent 16 gathers user actions including logins, browsing history, and clickstreams from a browser 50 with which it is integrated or in communication with, which data is transmitted to the security manager 20 via the security API 30. The security manager 20 provides threat information to the security agent 16 via the security API 30 for enabling the security agent 16 to provide notifications to a user and to filter and block network-based threats confronted by a browser 50. Further, the security agent 16 can engage with local applications 52 for example standalone applications, plugins, add-ons, or extensions to existing applications, to manage threats confronted by the local applications 52. The security agent 16 can monitor actions performed via the local applications 52 including logins to online services enabled by the local applications 52, which data is transmitted to the security manager 20 via the security API 30. An operating system 60 (hereinafter "OS 60") is executed on the computing device 12 which enables integration of the security agent 16 and the browsers 50 and local applications 52.

A user via the computing device 12 can engage web/app servers 40 via a browser 50 or local application 52 to register new accounts and modify account values (e.g., account passwords, credit card information, and home address) on online services including websites, applications, or other online services. The security agent 16 monitors access to online services and logs access to online services in a local datastore 54 and provide logs to the security manager 20 via the security API 30 for storage in the user datastore 26.

The security manager 20 compares data values detected in data repositories 72 (e.g., on darknets, the dark web) to the log of current and previous account values including passwords and other accounts values of accounts created by the security manager (e.g., synthetic accounts) stored in the accounts datastore 24. By the comparison, the security manager 20 determines if any data values in the data repositories 72 match data values of the accounts in the account datastore 24 to determine a leak from a particular online service. A time range within which the leak occurred is determined as when the leaked data value was active on the particular online service. One or both of the security manager 20 or the security agent 16 can compare the particular online service and the time range of the leak to the browsing history or application use of a particular user of a computing device 12, for example to determine if the particular user accessed the particular online service prior to the leak. Further, the security agent 16 can provide a notification to the particular user based on the comparison.

Table 1 shows exemplary account values including usernames and passwords generated for particular synthetic accounts on particular hypothetical exemplary sites at particular times. Passwords for each account are modified every twenty-four hours beginning 12:00 AM of each day. In actual implementations, passwords can be periodically modified (e.g., every twenty-four hours) for an indefinite period of time. As described herein, modifying a password can include replacing an existing password with a new password.

TABLE 1

| Domain | Username | Password | Time Password Active |
|---|---|---|---|
| abcxyz.com | abcxyz555@abcxyz.com | XYzzrt121!jdnfjg | Jun. 8, 2021 12:00 AM until Jun. 9, 2021 12:00 AM |
| abcxyz.com | abcxyz555@abcxyz.com | ZPcrff232$xpemgh | Jun. 9, 2021 12:00 AM until Jun. 10, 2021 12:00 AM |
| abcxyz.com | abcxyz555@abcxyz.com | SAkibb343$kenmgp | Jun. 10, 2021 12:00 AM until Jun. 11, 2021 12:00 AM |
| efgtuv.com | efgtuv555@efgtuv.com | EFewss121#eifmghp | Jun. 8, 2021 12:00 AM until Jun. 9, 2021 12:00 AM |
| efgtuv.com | efgtuv555@efgtuv.com | YHwwty262%eijnem | Jun. 9, 2021 12:00 AM until Jun. 10, 2021 12:00 AM |
| efgtuv.com | efgtuv555@efgtuv.com | JPecss393*eigjhn | Jun. 10, 2021 12:00 AM until Jun. 11, 2021 12:00 AM |
| mnoqrs.com | mnoqrs555@mnoqrs.com | PLuurr121#uejdnq | Jun. 8, 2021 12:00 AM until Jun. 9, 2021 12:00 AM |
| mnoqrs.com | mnoqrs555@mnoqrs.com | MNkdfo252$hddier | Jun. 9, 2021 12:00 AM until Jun. 10, 2021 12:00 AM |
| mnoqrs.com | mnoqrs555@mnoqrs.com | YUdsfo373&ccdwew | Jun. 10, 2021 12:00 AM until Jun. 11, 2021 12:00 AM |

Figure 2:
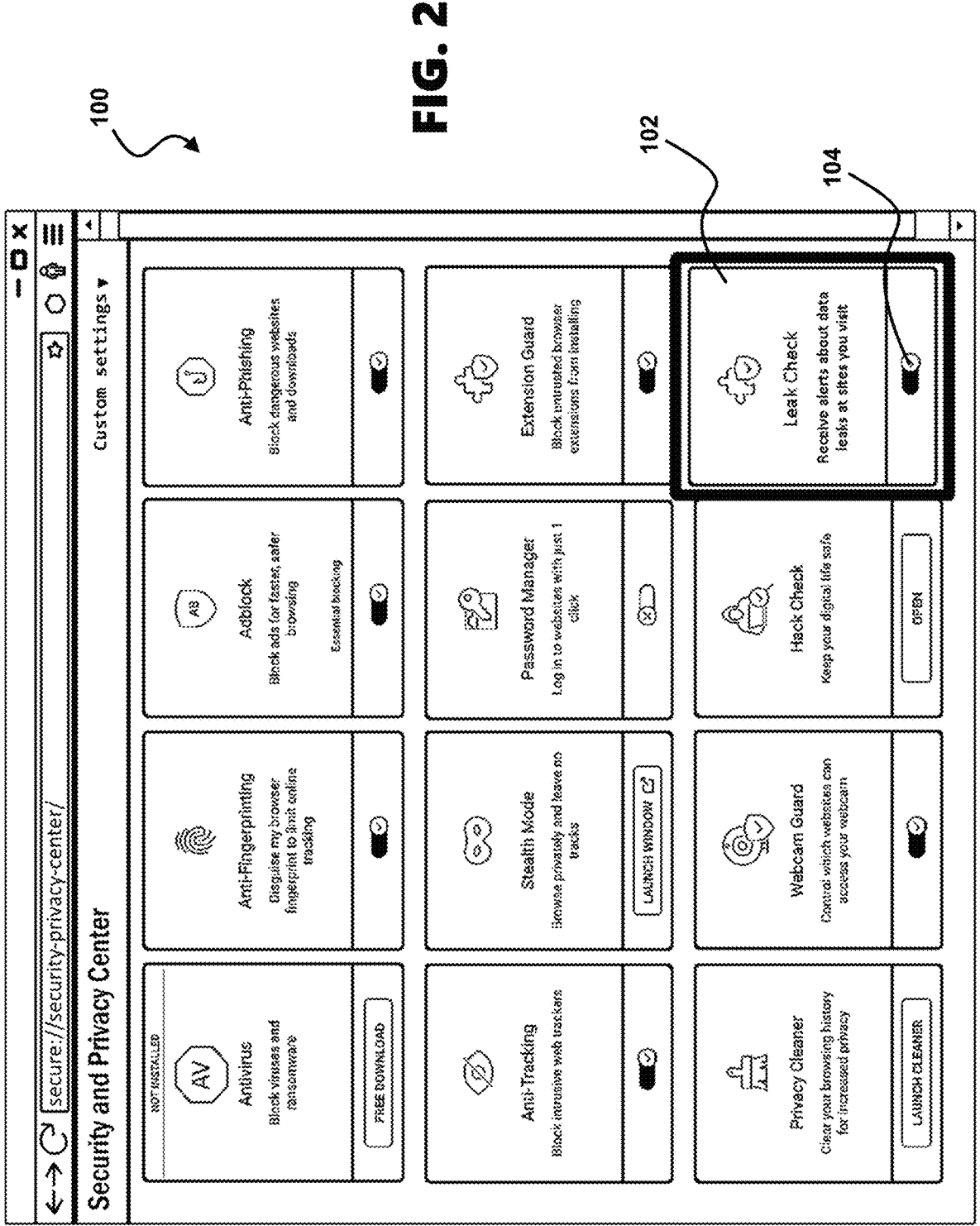
FIG. 2 shows a security module selection browser window enabled by a browser in a user interface of a computing device according to illustrative embodiments.

Referring to FIG. 2, an exemplary security module selection browser window 100 is shown which is enabled by a browser 50 within the user interface 58 of a computing device 12. The security module selection browser window 100 enables selection by a user of a plurality of security features for use integral with the browser 50. The security agent 16 is enabled as an extension in the browser 50 by a user's actuation of a toggle switch 104 on a leak check module 102 displayed among other modules in the security module selection browser window 100 and indicating a feature including "receive alerts about data leaks at sites you visit".

Figure 3:
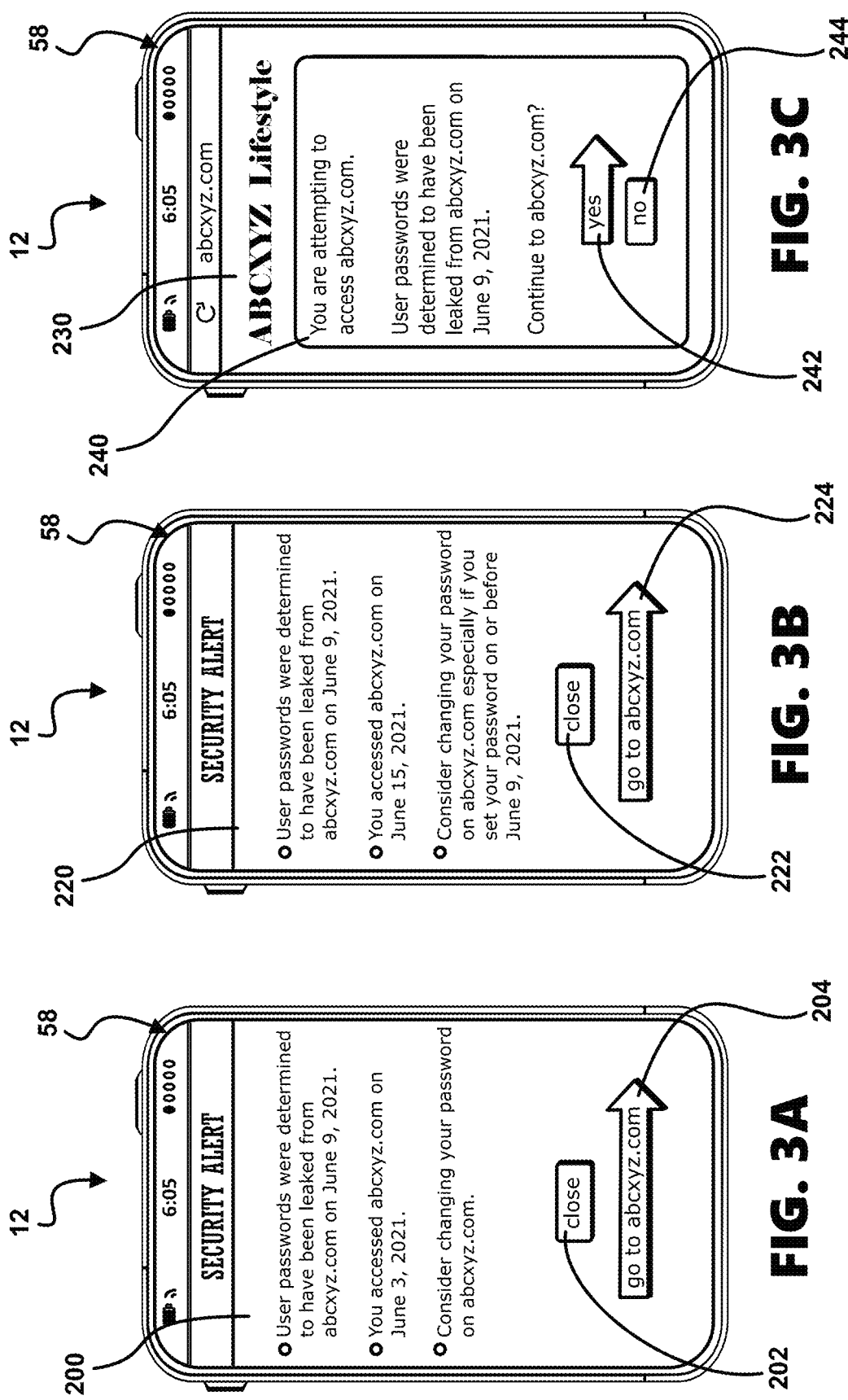
FIG. 3A-3C show exemplary interactive displays on a computing device showing security alerts according to illustrative embodiments.

Referring to FIGS. 3A, 3B, and 3C, hypothetical first, second, and third exemplary interactive displays 200, 220, 240 show notifications generated by the security agent 16 via the user interface 58 of the computing device 12 based on leaked account values (e.g., account values of synthetic accounts) detected by the security manager 20 and further based on user actions including logins, browsing history, and clickstreams from a browser 50. The first exemplary interactive display 200 indicates that "User passwords were determined to have been leaked from abcxyz.com on Jun. 9, 2021", which statement is generated for example based on detecting the username "abcxyz555@abcxyz.com" and password "ZPcrff232$xpemgh" of Table 1 on a data repository 72 on the dark web. The first exemplary interactive display 200 further indicates that "You accessed abcxyz.com on Jun. 3, 2021", which statement is generated for example based on detecting via the security agent 16 that a user of the computing device 12 accessed a webpage or other resource under the domain of abcxyz.com via a browser 50, which access occurred prior to the determined Jun. 9, 2021 leak date. The first exemplary interactive display 200 further suggests "Consider changing your password on abcxyz.com." A first actuatable "close" screen button 202 permits a user to navigate away from the first exemplary interactive display 200. A first actuatable "go to abcxyz.com" screen button 204 permits a user to navigate to a network location represented by the uniform resource locator ("URL") https://www.abcxyz.com, for example to change their password for online services provided at the network location.

The second exemplary interactive display 220 indicates that "User passwords were determined to have been leaked from abcxyz.com on Jun. 9, 2021", which statement is generated for example based on detecting the username "abcxyz555@abcxyz.com" and password "ZPcrff232$xpemgh" of Table 1 on a data repository 72 on the dark web. The second exemplary interactive display 220 further indicates that "You accessed abcxyz.com on Jun. 15, 2021", which statement is generated for example based on detecting via the security agent 16 that a user of the computing device 12 accessed a webpage or other resource under the domain of abcxyz.com via a browser 50, which access occurred after the determined Jun. 9, 2021 leak date. The second exemplary interactive display 220 further suggests "Consider changing your password on abcxyz.com especially if you set your password on or before Jun. 9, 2021." A second actuatable "close" screen button 222 permits a user to navigate away from the second exemplary interactive display 220. A second actuatable "go to abcxyz.com" screen button 224 permits a user to navigate to a network location represented by the URL https://www.abcxyz.com, for example to change their password for online services provided at the network location.

The third exemplary interactive display 240 is generated responsive to a user accessing a webpage 230 on the abcxyz.com domain. The third exemplary interactive display 240 indicates that "You are attempting to access abcxyz.com" and "User passwords were determined to have been leaked from abcxyz.com on Jun. 9, 2021", which statements are generated for example based on detecting the username "abcxyz555@abcxyz.com" and password "ZPcrff232$xpemgh" of Table 1 on a data repository 72 on the dark web and based on the user's attempt to access a network location represented by the URL abcxyz.com. The third exemplary interactive display 240 queries "Continue to abcxyz.com?" An actuatable "yes" screen button 242 permits a user to access content at the network location represented by the URL https://www.abcxyz.com. An actuatable "no" screen button 244 permits a user to navigate away from the network location represented by the URL https://www.abcxyz.com.

Figure 4:
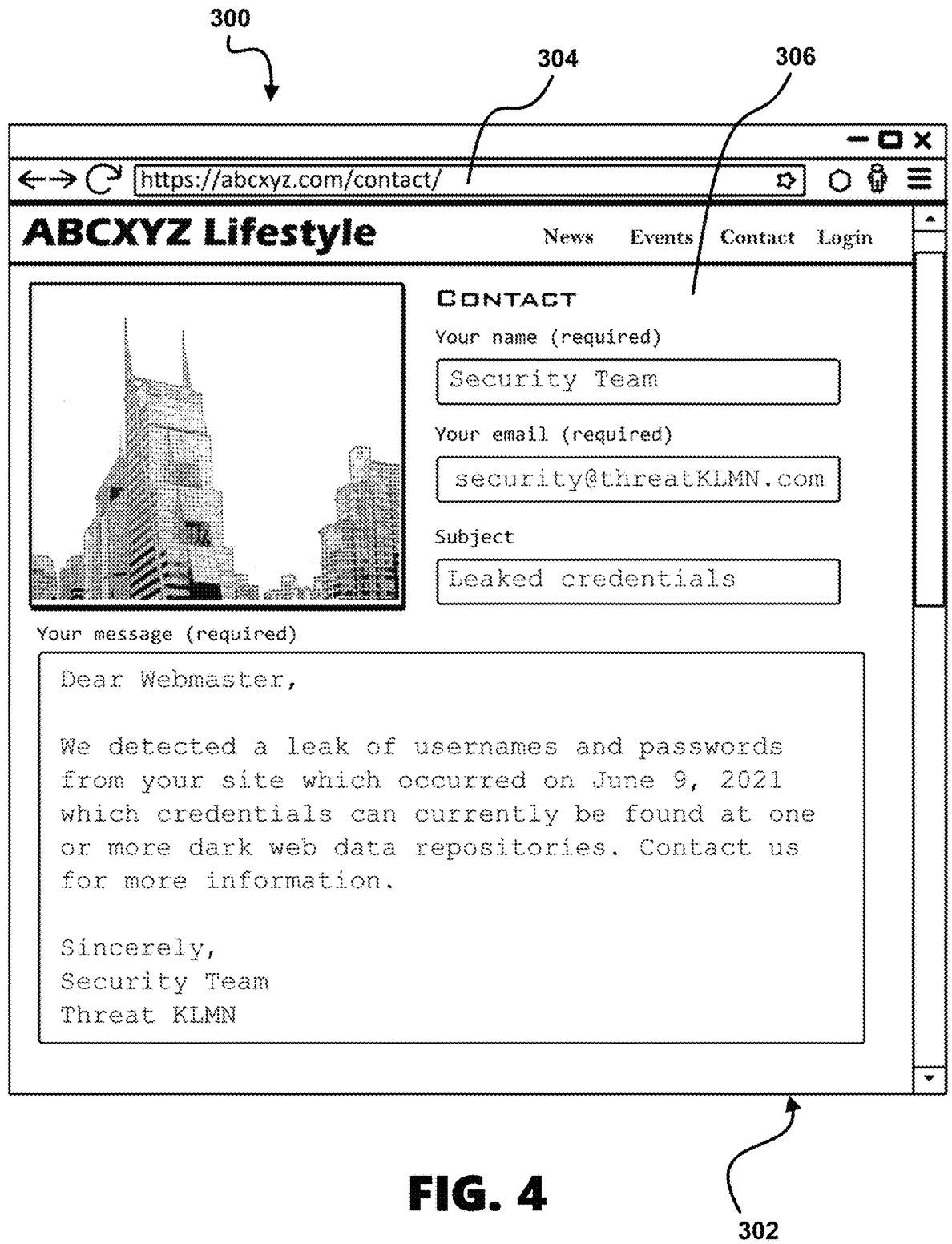
FIG. 4 shows a webpage browser window screen capture of an exemplary webpage for the purpose of describing methods according to illustrative embodiments.

Referring to FIG. 4, a webpage browser window screen capture 300 of a hypothetical exemplary webpage 302 is shown. The webpage 302 is accessed by the security manager 20 via the service interface 32, for example based on detecting via the scanning interface 22 the username "abcxyz555@abcxyz.com" and password "ZPcrff232$xpemgh" of Table 1 on a data repository 72 on the dark web. An exemplary URL for the webpage 302 is shown in a browser window address bar 304. The webpage 302 includes a contact form 306 in which the security manager 20 via the service interface 32 enters contact details and a message indicating a leak on Jun. 9, 2021 of user account information including usernames and passwords from the abcxyz.com site.

Figure 5:
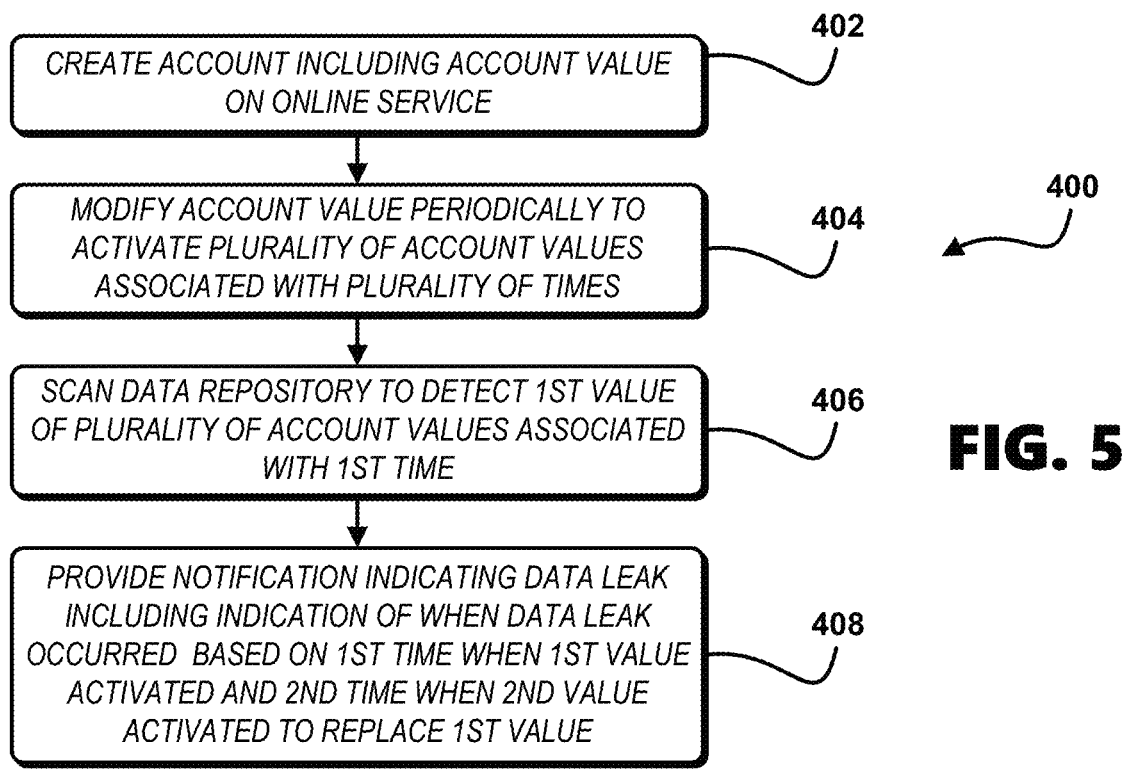
FIGS. 5-8 are diagrams showing data leak determining methods according to illustrative embodiments.

Referring to FIG. 5, a method 400 for determining data leaks is shown. The method 400 is described with reference to the components in the environment 10. Alternatively, the method 400 can be performed via other components in other environments and is not restricted to being implemented by the so described components.

In a step 402, an account is created including an account value on an online service. The online service can include a network-accessible service including for example a website or an application. The account value of the account on the online service is modified periodically to activate a plurality of account values respectively associated with a plurality of times at which the plurality of account values were respectively activated on the account (step 404). For example, the account value can be modified every 12 hours to every 48 hours. The time periods separating the modifications to the account value can be equal (e.g., modifications occurring every 24 hours) or unequal (i.e., modifications occurring at different time intervals). Modifying the account value includes replacing the account value with another account value. The account value can include an account password, and modifying the account value can include modifying the account password. The plurality of account values beneficially include a plurality of unique account values.

A network-accessible data repository is scanned to detect a first value of the plurality of account values on the network-accessible data repository, the first value associated with a first time of the plurality of times at which the first value was activated on the account (step 406). Scanning occurs for example via a wide area network including the internet. Beneficially, a plurality of network locations are scanned, the plurality of network locations including the network-accessible data repository, to detect the first value. The plurality of account values respectively associated with the plurality of times can be stored in a database, the network-accessible data repository can be scanned based on the plurality of account values in the database, and the first time can be looked up in the database responsive to detecting the first value on the network-accessible data repository.

Responsive to detecting the first value on the network-accessible data repository a notification is provided indicating a data leak from the online service including an indication of when the data leak occurred, wherein the indication of when the data leak occurred is based on the first time at which the first value was activated on the account and a second time of the plurality of times at which a second value was activated on the account to replace the first value (step 408). For example, if the first time is 12:00 AM Jun. 9, 2021 and the second time is 12:00 AM Jun. 10, 2021, an exemplary indication of when a data leak occurred can read "User passwords were determined to have been leaked from abcxyz.com on Jun. 9, 2021" as set forth in the third exemplary interactive display 240 shown in FIG. 3C or "We detected a leak of usernames and passwords from your site which occurred on Jun. 9, 2021" as set forth in the contact form 306 as shown in FIG. 4.

The notification of step 408 can be provided to an operator of the online service for example in the manner shown in the webpage browser window screen capture 300. Alternatively, access by a user via a computing device to the online service can be detected, and the notification can be provided to the user via the computing device based on the detection of the access for example in the manners shown in the first, second, and third exemplary interactive displays 200, 220, 240. For example, an agent connected to a browser on the computing device can be enabled, and the access to the online service by the user can be detected via the browser via the agent. The agent can include one or both of a browser extension or a browser plugin.

Figure 6:
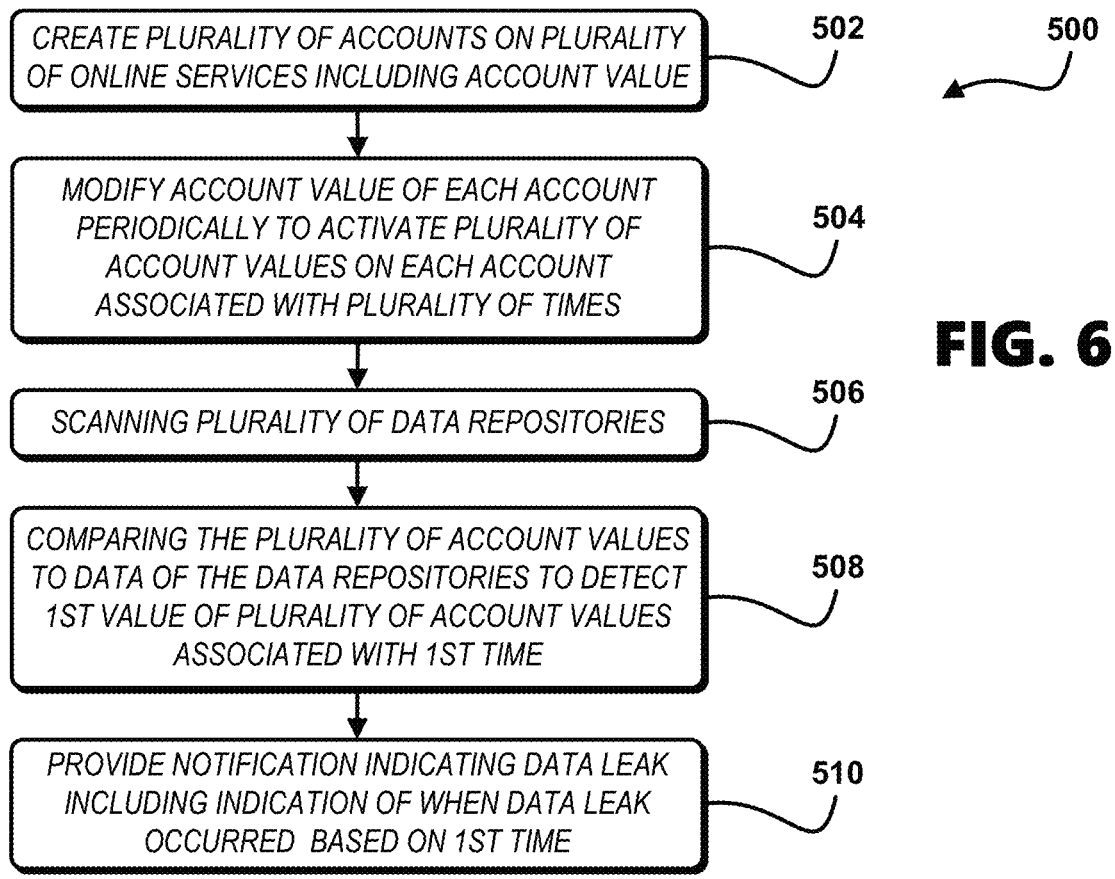

Referring to FIG. 6, a method 500 for determining data leaks is shown. The method 500 is described with reference to the components in the environment 10. Alternatively, the method 500 can be performed via other components in other environments and is not restricted to being implemented by the so described components.

In a step 502, a plurality of accounts are created on a plurality of online services, the plurality of accounts each including an account value. The account value of each of the plurality of accounts on the plurality of online services is modified periodically to activate a plurality of account values on each of the plurality of accounts respectively associated with a plurality of times at which the plurality of account values were respectively activated on each of the plurality of accounts (step 504). The account value can include for example an account password, and modifying the account value can include modifying the account password.

A plurality of network-accessible data repositories including data are scanned (step 506), for example via a wide area network including the internet. The plurality of account values are compared with the data of the plurality of network-accessible data repositories to detect a first value of the plurality of account values associated with a particular online service of the plurality of online services and associated with a first time of the plurality of times at which the first value was activated on a particular account of the particular online service (step 508).

Responsive to detecting the first value on the network-accessible data repository, a notification is provided indicating a data leak from the particular online service including an indication of when the data leak occurred based on the first time at which the first value was activated on the particular account (step 510). The notification indicating the data leak from the particular online service including the indication of when the data leak occurred can be provided further based on a second time of the plurality of times at which a second value was activated on the particular account to replace the first value. The method 500 can further include detecting access by a user on a browser via a computing device to the particular online service, and providing the notification to the user via the computing device further based on the detection of the access.

The plurality of account values respectively associated with the plurality of times of step 504 can be stored in a database, and the plurality of network-accessible data repositories can be scanned based on the plurality of account values in the database, and the first time can be looked up in the database responsive to detecting the first value. Further, a second time of the plurality of times at which a second value was activated on the account to replace the first value can be looked up responsive to detecting the first value, and the notification can be provided further based on the second time of the plurality of times at which the second value was activated on the account to replace the first value, for example in the manner shown in the webpage browser window screen capture 300 or in the manners shown in the first, second, and third exemplary interactive displays 200, 220, 240.

Figure 7:
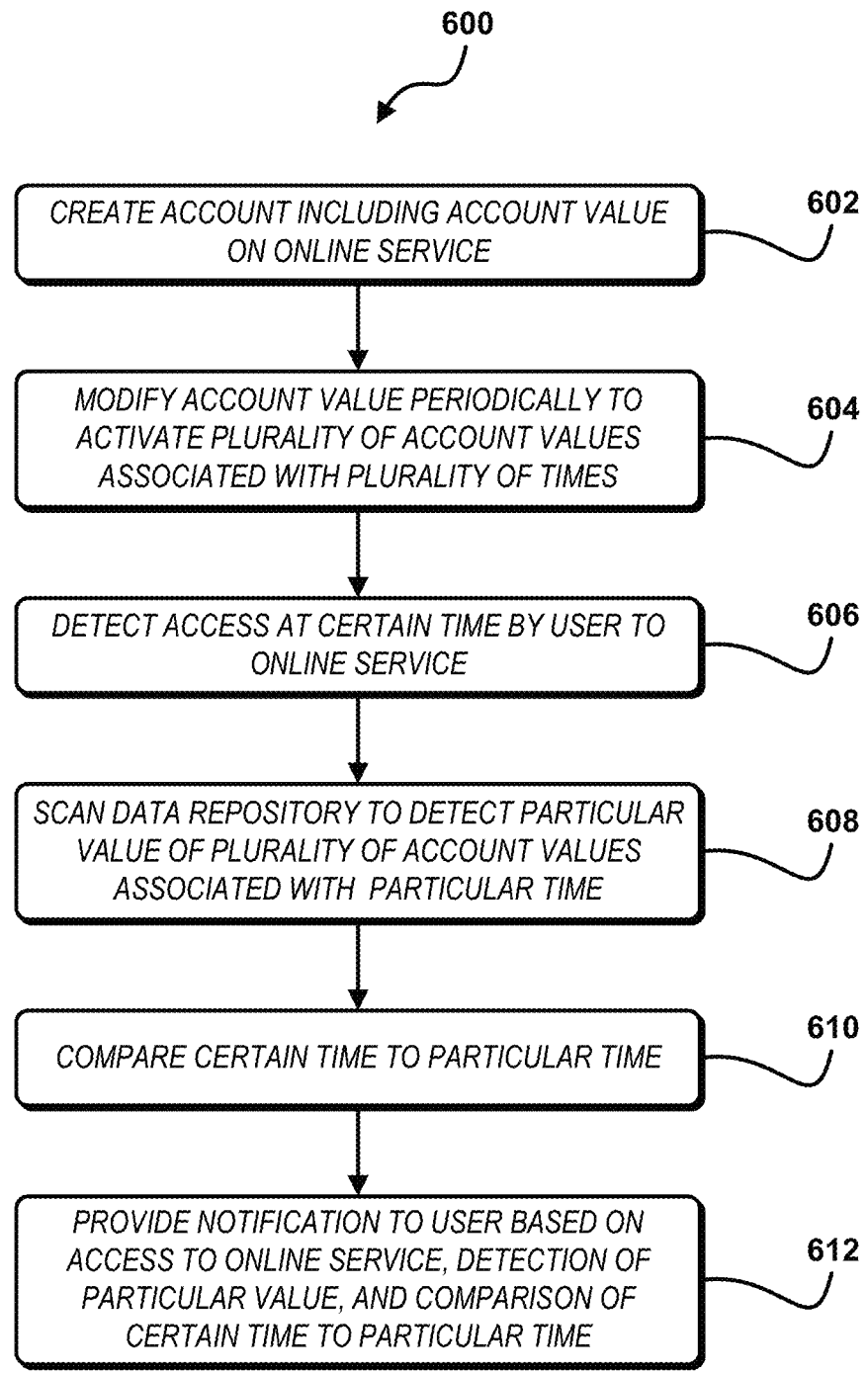

Referring to FIG. 7, a method 600 for determining data leaks is shown. The method 600 is described with reference to the components in the environment 10. Alternatively, the method 600 can be performed via other components in other environments and is not restricted to being implemented by the so described components.

In a step 602, an account including an account value is created on an online service. The online service can include for example one or both of a communication application or a financial application. The account value of the account on the online service is modified periodically to activate a plurality of account values respectively associated with a plurality of times at which the plurality of account values were respectively activated on the account (step 604). The account value can include for example an account password, and modifying the account value can include modifying the account password. Periodically modifying the account value of the account on the online service can include modifying the account value every 12 hours to 48 hours, for example every 24 hours. The time periods separating modifications to the account value can be equal or unequal. Modifying the account value includes replacing the account value with another account value.

Access by a user via a computing device to the online service is detected, the access occurring at a certain time (step 606). The online service can include for example a webpage, and detecting the access by the user via the computing device can include detecting logging on by the user to the online service via the webpage. Network browsing by the user on the computing device can be monitored via a browser to detect the access by the user via the browser to the online service.

A network-accessible data repository is scanned to detect a particular value of the plurality of account values on the network-accessible data repository, the particular value associated with a particular time of the plurality of times at which the particular value was activated on the account (step 608). For example a plurality of network locations can be scanned, the plurality of network locations including the network-accessible data repository, to detect the particular value.

The certain time is compared to the particular time (step 610). A notification is provided to the user of the computing device based on the access by the user to the online service, based on the detection of the particular value on the network-accessible data repository, and based on the comparison of the certain time to the particular time (step 612). For example, it can be determined that the certain time is prior to the particular time, and the notification can be provided based on the determination that the certain time is prior to the particular time.

Figure 8:
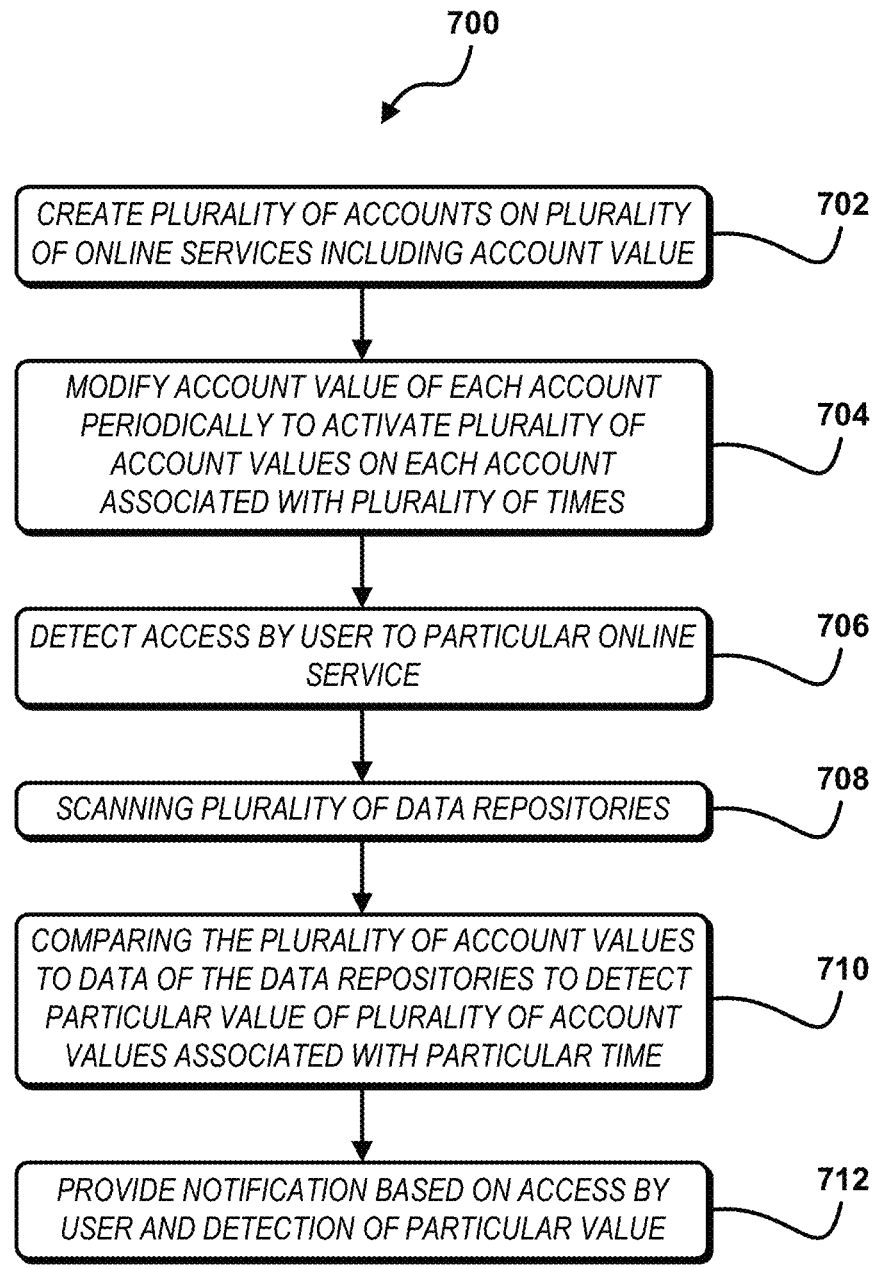

Referring to FIG. 8, a method 700 for determining data leaks is shown. The method 700 is described with reference to the components in the environment 10. Alternatively, the method 700 can be performed via other components in other environments and is not restricted to being implemented by the so described components.

In a step 702, a plurality of accounts are created on a plurality of online services, the plurality of accounts each including an account value. The account value of each of the plurality of accounts on the plurality of online services is modified periodically to activate a plurality of account values on each of the plurality of accounts respectively associated with a plurality of times at which the plurality of account values were respectively activated on each of the plurality of accounts (step 704). Access by a user via a computing device to a particular online service of the plurality of online services is detected (step 706).

A plurality of network-accessible data repositories including data are scanned (step 708), for example via a wide area network including the internet. The plurality of account values are compared to the data of the plurality of network-accessible data repositories to detect a particular value of the plurality of account values associated with the particular online service of the plurality of online services and associated with a particular time of the plurality of times at which the particular value was activated on a particular account of the particular online service (step 710). A notification is provided to the user of the computing device based on the access by the user to the particular online service and based on the detection of the particular value (step 712).

In an extension to the method 700, a certain time of the access by the user to the particular online service can be detected, the certain time can be compared to the particular time, and the notification can be provided to the user of the computing device further based on the comparison of the certain time to the particular time. For example, the certain time can be determined to be prior to the particular time based on the comparison of the certain time to the particular time, and the notification can be provided to the user of the computing device further based on the determination that the certain time is prior to the particular time.

In a particular implementation of the method 700, detecting the access by the user to the particular online service can include detecting the access by the user via a web browser via a user interface of the computing device after detecting the particular value of the plurality of account values associated with the particular online service of the plurality of online services, and providing the notification to the user can include providing the notification via the web browser in the user interface. In another implementation of the method 700, detecting the access by the user can include detecting an attempt to create an account on the particular online service, and providing the notification can include providing the notification responsive to detecting the attempt to create the account on the particular online service.

Figure 9:
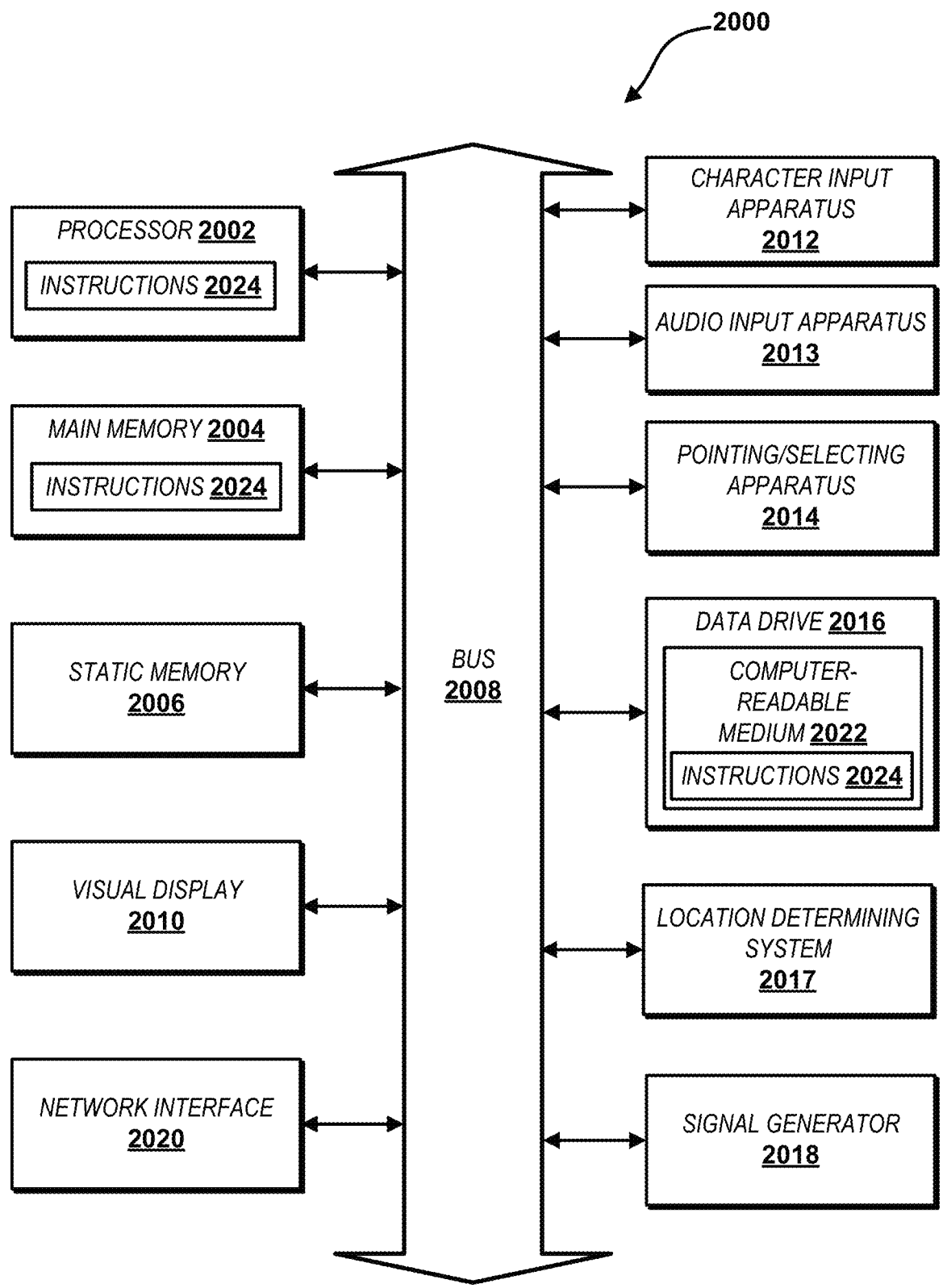
FIG. 9 shows a computer system for performing described methods according to illustrative embodiments.

FIG. 9 illustrates in abstract the function of an exemplary computer system 2000 on which the systems, methods and processes described herein can execute. For example, the computing device 12 and the security manager 20 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A computer-implemented method comprising:
creating an account comprising an account value on an online service;
modifying the account value of the account on the online service periodically to activate a plurality of account values respectively associated with a plurality of time instances at which the plurality of account values were respectively activated on the account;
detecting access by a user via a computing device to the online service, the access occurring at an access time;
scanning a network-accessible data repository to detect a first value of the plurality of account values on the network-accessible data repository, the first value associated with a first time of the plurality of time instances at which the first value was activated on the account;

comparing the access time to the first time of the plurality of time instances; and responsive to detecting the first value on the network-accessible data repository and based on the comparison of the access time to the first time, providing a notification to the user via the computing device indicating a data leak from the online service including an indication of when the data leak occurred based on the first time of the plurality of time instances at which the first value was activated on the account and a second time of the plurality of time instances at which a second value was activated on the account to replace the first value.

2. The computer-implemented method of claim 1, further comprising providing the notification to an operator of the online service.

3. The method of claim 1, further comprising:
enabling an agent connected to a browser on the computing device; and
detecting the access to the online service by the user via the browser via the agent.

4. The method of claim 3, wherein the agent comprises at least one of a browser extension or a browser plugin.

5. The method of claim 1, wherein:
the account value comprises an account password; and
modifying the account value comprises modifying the account password.

6. The method of claim 1, wherein periodically modifying the account value of the account on the online service comprises modifying the account value every 12 hours to every 48 hours.

7. The method of claim 1, further comprising scanning a plurality of network locations, the plurality of network locations comprising the network-accessible data repository, to detect the first value.

8. The method of claim 1, wherein the plurality of account values include a plurality of unique account values.

9. The method of claim 1, further comprising:
storing the plurality of account values respectively associated with the plurality of time instances in a database;
scanning the network-accessible data repository based on the plurality of account values in the database; and
looking up the first time of the plurality of time instances in the database responsive to detecting the first value on the network-accessible data repository.

10. A computer-implemented method comprising:
creating a plurality of accounts on a plurality of online services, the plurality of accounts each comprising an account value;
modifying the account value of each of the plurality of accounts on the plurality of online services periodically to activate a plurality of account values on each of the plurality of accounts respectively associated with a plurality of time instances at which the plurality of account values were respectively activated on each of the plurality of accounts;
detecting access by a user via a computing device to a particular online service of the plurality of online services, the access occurring at an access time;
scanning a plurality of network-accessible data repositories comprising data;
comparing the plurality of account values to the data of the plurality of network-accessible data repositories to detect a first value of the plurality of account values associated with the particular online service of the plurality of online services and associated with a first time of the plurality of time instances at which the first value was activated on a particular account of the particular online service;
comparing the access time to the first time of the plurality of time instances; and
responsive to detecting the first value and based on the comparison of the access time and the first time, providing a notification to the user via the computing device indicating a data leak from the particular online service including an indication of when the data leak occurred based on the first time of the plurality of time instances at which the first value was activated on the particular account.

11. The method of claim 10, further comprising providing the notification indicating the data leak from the particular online service including the indication of when the data leak occurred further based on a second time of the plurality of time instances at which a second value was activated on the particular account to replace the first value.

12. The method of claim 10, further comprising detecting the access by the user on a browser via the computing device.

13. The method of claim 10, wherein:
the account value comprises an account password; and
modifying the account value comprises modifying the account password.

14. The method of claim 10, further comprising:
storing the plurality of account values respectively associated with the plurality of time instances in a database;
scanning the plurality of network-accessible data repositories based on the plurality of account values in the database; and
looking up the first time of the plurality of time instances in the database responsive to detecting the first value.

15. The method of claim 14, further comprising:
responsive to detecting the first value looking up in the database a second time of the plurality of time instances at which a second value was activated on the particular account to replace the first value; and
providing the notification further based on the second time of the plurality of times time instances at which the second value was activated on the particular account to replace the first value.

16. A network-enabled notification system comprising:
a computing system comprising at least one processor and at least one non-transitory computer readable storage medium having encoded thereon instructions that when executed by the at least one processor cause the computing system to perform a process including:
creating a plurality of accounts on a plurality of online services, the plurality of accounts each comprising an account value;
modifying the account value of each of the plurality of accounts on the plurality of online services periodically to activate a plurality of account values on each of the plurality of accounts respectively associated with a plurality of time instances at which the plurality of account values were respectively activated on each of the plurality of accounts;
detecting access by a user via a computing device to the online service, the access occurring at a access time;
scanning a plurality of network-accessible data repositories comprising data;
comparing the plurality of account values to the data of the plurality of network-accessible data repositories to detect a particular value of the plurality of account values associated with a particular online service of the plurality of online services and associated with a first time of the plurality of time instances at which the particular value was activated on a particular account of the particular online service;

comparing the access time to the first time of the plurality of time instances; and responsive to detecting the particular value and based on the comparison of the access time to the first time of the plurality of time instances, providing a notification to the user via the computing device indicating a data leak from the particular online service including an indication of when the data leak occurred based on the first time of the plurality of time instances at which the particular value was activated.

17. A computer-implemented method comprising:

creating an account comprising an account value on an online service;

modifying the account value of the account on the online service periodically to activate a plurality of account values respectively associated with a plurality of times time instances at which the plurality of account values were respectively activated on the account;

detecting access by a user via a computing device to the online service, the access occurring at an access time;

scanning a network-accessible data repository to detect a particular value of the plurality of account values on the network-accessible data repository, the particular value associated with a first time of the plurality of time instances at which the particular value was activated on the account;

comparing the access time to the first time of the plurality of time instances; and providing a notification to the user of the computing device based on the access by the user to the online service, based on the detection of the particular value on the network-accessible data repository, and based on the comparison of the access certain time to the first time of the plurality of time instances.

18. The method of claim 17, wherein:

the account value comprises an account password; and modifying the account value comprises modifying the account password.

19. The method of claim 17, wherein the online service comprises at least one of a communication application or a financial application.

20. The method of claim 17, wherein periodically modifying the account value of the account on the online service comprises modifying the account value every 12 hours to every 48 hours.

21. The method of claim 17, further comprising scanning a plurality of network locations, the plurality of network locations comprising the network-accessible data repository, to detect the particular value.

22. The method of claim 17, wherein:

the online service comprises a webpage; and detecting the access by the user via the computing device comprises detecting logging on by the user to the online service via the webpage.

23. The method of claim 17, further comprising:

determining that the access time is prior to the first time of the plurality of time instances; and providing the notification based on the determination that the access time is prior to the first time of the plurality of time instances.

24. The method of claim 17, further comprising monitoring network browsing by the user on the computing device via a browser to detect the access by the user via the browser to the online service.

25. A computer-implemented method comprising:

creating a plurality of accounts on a plurality of online services, the plurality of accounts each comprising an account value;

modifying the account value of each of the plurality of accounts on the plurality of online services periodically to activate a plurality of account values on each of the plurality of accounts respectively associated with a plurality of time instances at which the plurality of account values were respectively activated on each of the plurality of accounts;

detecting access by a user via a computing device to a particular online service of the plurality of online services, the access occurring at an access certain time;

scanning a plurality of network-accessible data repositories comprising data;

comparing the plurality of account values to the data of the plurality of network-accessible data repositories to detect a particular value of the plurality of account values associated with the particular online service of the plurality of online services and associated with a first time of the plurality of time instances at which the particular value was activated on a particular account of the particular online service;

comparing the access time to the first time of the plurality of time instances; and providing a notification to the user of the computing device based on the access by the user to the particular online service, based on the detection of the particular value, and based on the comparison of the certain time to the first time of the plurality of time instances.

26. The method of claim 25, further comprising:

determining the access time is prior to the first time based on the comparison of the access time to the first time; and providing the notification to the user of the computing device further based on the determination that the access time is prior to the first time.

27. The method of claim 25, further comprising scanning the plurality of network-accessible data repositories via a wide area network comprising the internet.

28. The method of claim 25, wherein:

detecting the access by the user comprises detecting the access by the user via a web browser via a user interface of the computing device to the particular online service after detecting the particular value of the plurality of account values associated with the particular online service of the plurality of online services; and providing the notification to the user comprises providing the notification via the web browser in the user interface.

29. The method of claim 25, wherein:

detecting the access by the user comprises detecting an attempt to create an account on the particular online service; and providing the notification comprises providing the notification responsive to detecting the attempt to create the account on the particular online service.

30. A network-enabled notification system comprising:

a first computing system comprising at least a first processor and at least a first non-transitory computer readable storage medium having encoded thereon first instructions that when executed by the at least the first processor cause the first computing system to perform a first process including:
  creating a plurality of accounts on a plurality of online services, the plurality of accounts each comprising an account value;
  modifying the account value of each of the plurality of accounts on the plurality of online services periodically to activate a plurality of account values on each of the plurality of accounts respectively associated with a plurality of time instances at which the plurality of account values were respectively activated on each of the plurality of accounts;
  scanning a plurality of network-accessible data repositories comprising data; and
  comparing the plurality of account values to the data of the plurality of network-accessible data repositories to detect a particular value of the plurality of account values associated with a particular online service of the plurality of online services and associated with a first time of the plurality of time instances at which the particular value was activated on a particular account of the particular online service; and
a second computing system in network communication with the first computing system, the second computing system comprising a user interface and at least a second processor and at least a second non-transitory computer readable storage medium having encoded thereon second instructions that when executed by the at least the second processor cause the second computing system to perform a second process including:
  detecting access by a user via the second computing system to the online service, the access occurring at an access time;
  comparing the access time to the first time of the plurality of time instances; and
  providing a notification to the user of the second computing system via the user interface based on the access by the user to the particular online service, based on the detection of the particular value, and based on the comparison of the access time to the first time of the plurality of time instances.

31. The network-enabled notification system of claim 30, wherein the second instructions when executed by the at least the second processor cause the second computing system to perform the second process further including monitoring network browsing by the user on the second computing system via a browser to detect the access by the user via the browser to the particular online service.

32. The method of claim 1, wherein the first time of the plurality of time instances comprises a range of time.

33. The method of claim 17, wherein the first time of the plurality of time instances comprises a range of time.

* * * * *

UNITED STATES PATENT AND TRADEMARK OFFICE
CERTIFICATE OF CORRECTION

PATENT NO. : 11,829,509 B2
APPLICATION NO. : 17/377298
DATED : November 28, 2023
INVENTOR(S) : Mesrsmid Page 1 of 1

It is certified that error appears in the above-identified patent and that said Letters Patent is hereby corrected as shown below:

In the Claims

In Claim 15, Column 16, Line 41, after the phrase "the plurality of" delete "times".

In Claim 17, Column 17, Line 21, after the word "of" delete "times".

In Claim 17, Column 17, Line 39, after the word "access", delete "certain".

In Claim 25, Column 18, Line 19, after the word "access", delete "certain".

In Claim 25, Column 18, Line 35, after the phrase "comparison of the", delete "certain" and insert therefor --access--.

Signed and Sealed this
Twenty-seventh Day of February, 2024

Katherine Kelly Vidal
*Director of the United States Patent and Trademark Office*